US009519300B2

(12) United States Patent
Mok et al.

(10) Patent No.: US 9,519,300 B2
(45) Date of Patent: Dec. 13, 2016

(54) REDUCING CROSS-REGULATION INTERFERENCES BETWEEN VOLTAGE REGULATORS

(76) Inventors: Ken Tsz Kin Mok, San Diego, CA (US); Juhi Saha, San Diego, CA (US); Ching Chang Shen, La Jolla, CA (US); John Eaton, San Diego, CA (US); Liang Yew Lin, San Diego, CA (US)

( * ) Notice: Subject to any disclaimer, the term of this patent is extended or adjusted under 35 U.S.C. 154(b) by 463 days.

(21) Appl. No.: 12/018,058

(22) Filed: Jan. 22, 2008

(65) Prior Publication Data

US 2009/0160251 A1 Jun. 25, 2009

Related U.S. Application Data

(60) Provisional application No. 61/015,652, filed on Dec. 20, 2007.

(51) Int. Cl.
*H02J 1/10* (2006.01)
*G05F 1/46* (2006.01)

(52) U.S. Cl.
CPC .............. *G05F 1/46* (2013.01); *Y10T 307/352* (2015.04)

(58) Field of Classification Search
CPC .................. H02J 1/00; H02J 3/00; H02J 1/10; H02J 3/46
USPC .............................. 307/24, 82; 713/300, 320
See application file for complete search history.

(56) References Cited

U.S. PATENT DOCUMENTS 6,031,362 A * 2/2000 Bradley ............ H02M 3/33561 323/267
6,359,794 B1 * 3/2002 Real ........................ H02J 9/062 307/66
6,713,992 B2 3/2004 Matsuo et al.
6,798,709 B2 9/2004 Sim et al.
6,978,388 B1 * 12/2005 Cornelius ..................... 713/320
7,062,647 B2 * 6/2006 Nguyen ................ G06F 1/3203 713/100
7,062,663 B2 * 6/2006 Meynard ....................... 713/320
7,196,501 B1 * 3/2007 Dunipace ................ G05F 1/565 323/270
7,304,867 B2 * 12/2007 Usui .......................... 363/21.06
(Continued)

FOREIGN PATENT DOCUMENTS

EP 1119894 B1 5/2003
JP 5127765 A 5/1993
(Continued)

OTHER PUBLICATIONS

International Search Report and Written Opinion—PCT/US2008/087546, International Search Authority—European Patent Office—Apr. 1, 2009.

*Primary Examiner* — Rexford Barnie
*Assistant Examiner* — Joseph Inge

(57) ABSTRACT

Exemplary embodiment of a device is disclosed comprising a processor to provide instructions, a first voltage regulator in communication with the processor to receive provided instructions received from the processor and to dynamically modulate an output voltage based on the received instructions, and a plurality of second voltage regulators to receive the output voltage from the first regulator; the output voltage to reduce a cross-regulation interference between the second regulators due to a change in a load of at least one of the second voltage regulators.

20 Claims, 8 Drawing Sheets

(56) References Cited

U.S. PATENT DOCUMENTS

| | | | | |
|---|---|---|---|---|
| 7,441,137 | B1 * | 10/2008 | Mimberg | G05F 1/462 713/300 |
| 7,518,263 | B2 * | 4/2009 | Gan et al. | 307/32 |
| 2002/0144163 | A1 * | 10/2002 | Goodfellow | H02J 1/102 713/300 |
| 2003/0226048 | A1 * | 12/2003 | Nguyen et al. | 713/320 |
| 2004/0221182 | A1 * | 11/2004 | He | G05F 5/00 713/300 |
| 2007/0075692 | A1 * | 4/2007 | Ostrom | G05F 1/618 323/274 |
| 2007/0174641 | A1 * | 7/2007 | Cornwell | G06F 1/26 713/300 |

FOREIGN PATENT DOCUMENTS

| | | | |
|---|---|---|---|
| JP | 10039937 | A | 2/1998 |
| JP | 2007529187 | A | 10/2007 |
| KR | 20050001213 | | 1/2005 |
| WO | WO2005038920 | | 4/2005 |
| WO | WO2006127714 | | 11/2006 |

* cited by examiner

REDUCING CROSS-REGULATION INTERFERENCES BETWEEN VOLTAGE REGULATORS

CLAIM OF PRIORITY UNDER 35 U.S.C. §119

The present Application for Patent claims priority to Provisional Application No. 61/015,652 entitled "Reducing cross-regulation interferences between voltage regulators" filed Dec. 20, 2007, and assigned to the assignee hereof and hereby expressly incorporated by reference herein.

BACKGROUND

Field

The present disclosure relates generally to voltage regulating devices, and more specifically to techniques for reducing interferences between voltage regulators.

Background

Voltage regulators are in widespread use today for maintaining or regulating the voltage at a desired level in a circuit or a portion of a circuit. A voltage regulator may be of a linear type, such as a low dropout regulator, or a non-linear type, such as a switching regular.

A linear voltage regulator offers the advantage of an output with reduced noise in their direct current (DC) output, but come with disadvantage of inefficient power usage. In contrast, a non-linear regular offers the advantages of efficient power usage but the disadvantages of added noise, relative to a linear voltage regulator.

Currently, one method to regulate voltage is to use a non-linear voltage regular in series with two or more linear voltage regulators. In this approach, the non-linear voltage regular is used to perform most of the voltage regulation (that is convert the battery voltage to a value that is very close to the required load voltage) so to take advantage of the power efficiency of the non-linear voltage regular. Linear voltage regulators, which have better noise performance, are then used to perform the final 'fine regulation' of the voltage.

A shortcoming in the above approach is that a change in the load in one linear voltage regulator adversely affects the performance of the other linear voltage regulator(s) due to a generated transient current. This current causes cross-regulation interference between the linear voltage regulators, resulting in added noise and other inefficiencies in the operations of the other voltage regulator(s) and hence the overall system.

Accordingly, there is a need in the art for reducing the cross-regulation interference between the linear voltage regulators.

DETAILED DESCRIPTION

The techniques described herein is applicable to and may be used for any electronic setting in any electrical or electronic environment in which voltage regulation is desired. For exemplary purposes only, the exemplary embodiments described herein are presented in the context of a wireless communication environment, though they are not meant to be limited to such, but applicable to any wire or wireless communication setting which use radio-frequency transmission and reception, such as cell-phones, base-stations as well as cable set-top boxes and the likes.

The techniques described herein may be used for various wireless communication networks such as wireless communication networks such as CDMA, TDMA, FDMA, OFDMA and SC-FDMA networks. The terms "network" and "system" are often used interchangeably. A CDMA network may implement a radio technology such as Universal Terrestrial Radio Access (UTRA), cdma2000, etc. UTRA includes Wideband-CDMA (W-CDMA), Low Chip Rate (LCR), High Chip Rate (HCR), etc. cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. These various radio technologies and standards are known in the art. UTRA, E-UTRA and GSM are described in documents from an organization named "3rd Generation Partnership Project" (3GPP). Cdma2000 is described in documents from an organization named "3rd Generation Partnership Project 2" (3GPP2). 3GPP and 3GPP2 documents are publicly available.

For clarity, certain aspects of the techniques are described below for 3GPP networks.

The word "exemplary" is used herein to mean "serving as an example, instance, or illustration." Any embodiment described herein as "exemplary" is not necessarily to be construed as preferred or advantageous over other embodiments.

Figure 1:
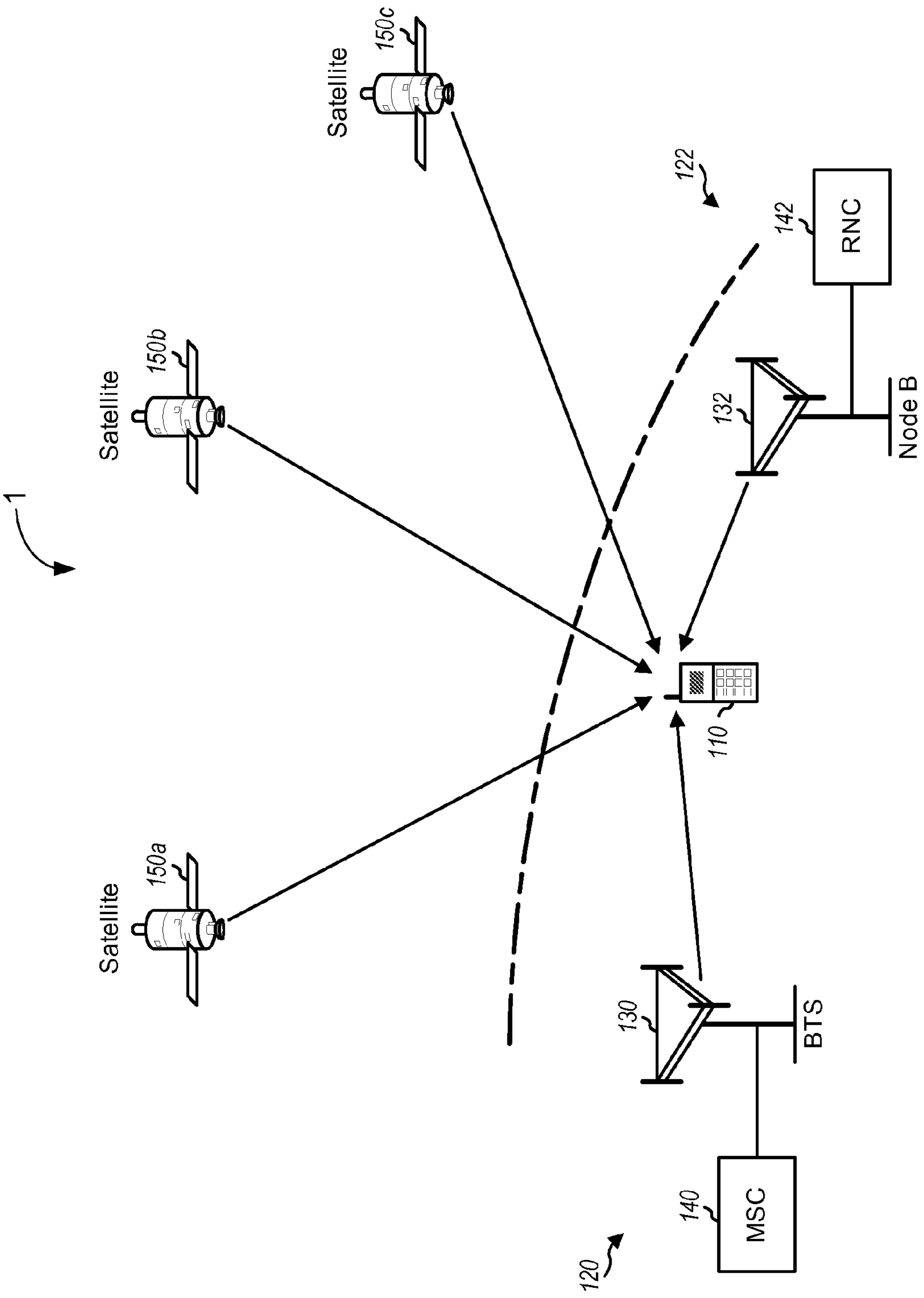
FIG. 1 illustrates an exemplary wireless communication environment in which exemplary embodiments of the disclosure can be practiced.

FIG. 1 illustrates an exemplary wireless communication environment 1 comprising communication systems 120 and 122 and a wireless device 110, such as a multi-antenna wireless device capable of communicating with multiple wireless communication systems 120 and 122. Wireless system 120 may be a CDMA system that may implement one or more CDMA standards such as, e.g., IS-2000 (commonly referred to as CDMA 1x), IS-856 (commonly referred to as CDMA 1x EV-DO), IS-95, W-CDMA, and so on. Wireless system 120 includes a base transceiver system (BTS) 130 and a mobile switching center (MSC) 140. BTS 130 provides over-the-air communication for wireless devices under its coverage area. MSC 140 couples to BTSs in wireless system 120 and provides coordination and control for these BTSs. Wireless system 122 may be a TDMA system that may implement one or more TDMA standards such as, e.g., GSM. Wireless system 122 includes a Node B 132 and a radio network controller (RNC) 142. Node B 132 provides over-the-air communication for wireless devices under its coverage area. RNC 142 couples to Node Bs in wireless system 122 and provides coordination and control for these Node Bs. In general, BTS 130 and Node B 132 are fixed stations that provide communication coverage for wireless devices and may also be referred to as base stations or some other terminology. MSC 140 and RNC 142 are network entities that provide coordination and control for the base stations and may also be referred to by other terminologies.

Wireless device 110 may be a cellular phone, a personal digital assistant (PDA), a wireless-enabled computer, or some other wireless communication unit or device.

Wireless device 110 may also be referred to as a mobile station (3GPP2 terminology), a user equipment (UE) (3GPP terminology), an access terminal, or some other terminology. Wireless device 110 is equipped with multiple antennas, e.g., one external antenna and one or more internal antennas. The multiple antennas may be used to provide diversity against deleterious path effects such as fading, multipath, interference, and so on. An RF modulated signal transmitted from an antenna at a transmitting entity may reach the multiple antennas at wireless device 110 via line-of-sight paths and/or reflected paths. At least one propagation path typically exists between the transmit antenna and each receive antenna at wireless device 110. If the propagation paths for different receive antennas are independent, which is generally true to at least an extent, then diversity increases and the received signal quality improves when multiple antennas are used to receive the RF modulated signal.

Wireless device 110 may or may not be capable of receiving signals from satellites 150. Satellites 150 may belong to a satellite positioning system such as the well-known Global Positioning System (GPS), the European Galileo system, or some other systems. Each GPS satellite transmits a GPS signal encoded with information that allows a GPS receiver on Earth to measure the time of arrival (TOA) of the GPS signal. Measurements for a sufficient number of GPS satellites may be used to obtain an accurate three-dimensional position estimate for the GPS receiver. In general, the wireless device 110 may be capable of communicating with any number of wireless systems of different wireless technologies (e.g., CDMA, GSM, GPS, and so on).

Figure 2:
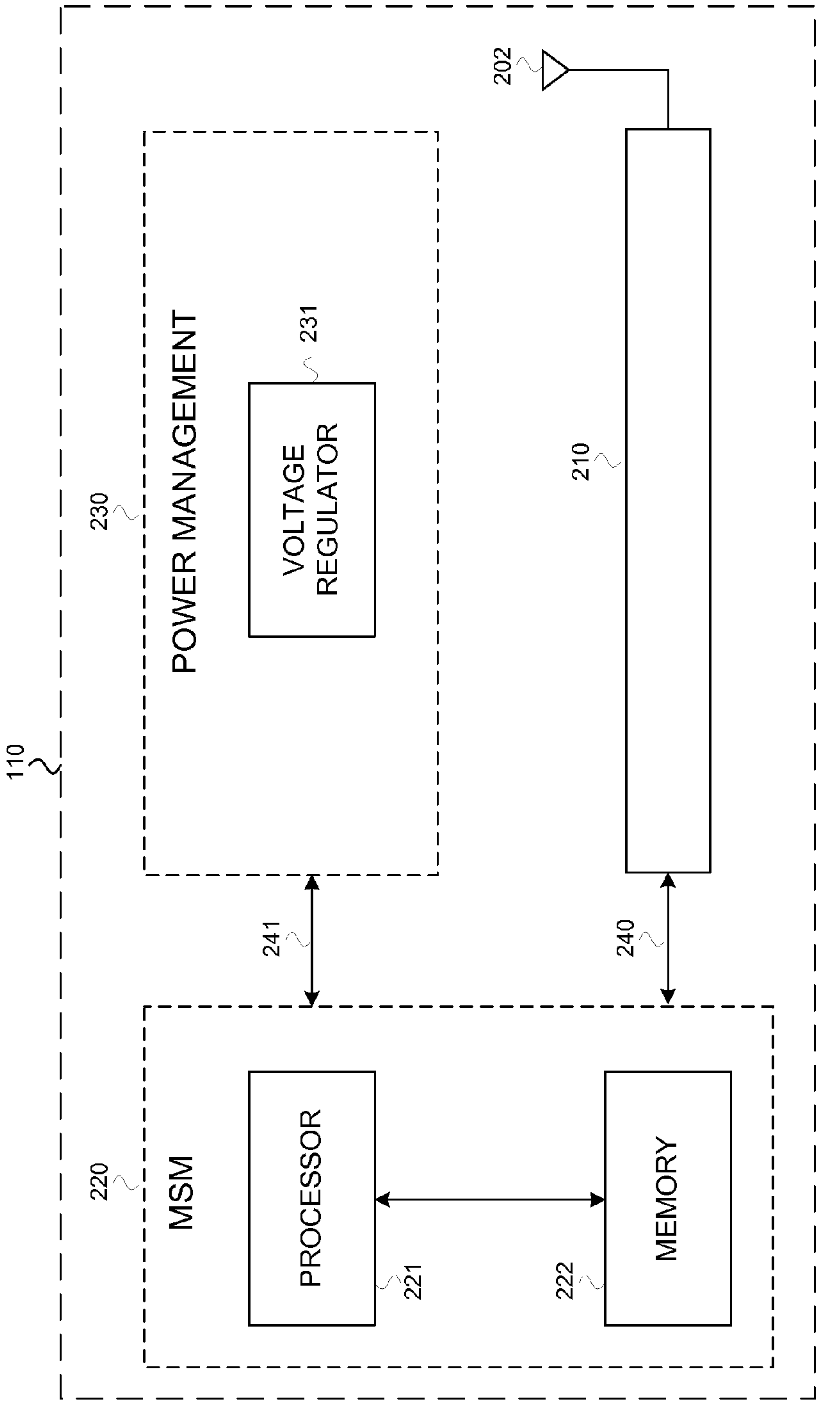
PRIOR ART FIG. 2
FIGS. 2-3 illustrate an exemplary wireless device using prior art techniques.

FIG. 2 is a block diagram illustrating an exemplary wireless device 110. Wireless device 110 includes a transceiver system 210 which at one end couples to an antenna 202, such as a main antenna, which may be an external antenna, and at the other end couples to a mobile station modem (MSM) 220, such as via path 240. MSM 220 comprises of a processor 221 which is in communication with a memory 222 which may be internal or external to MSM 220. MSM 220 is also in communication with a power management system 230, such as via path 241. Power management system 230, as described in greater detail in conjunction with FIG. 3 below, comprises one or more voltage regulators 231 for maintaining or regulating voltages at a desired level in the wireless device 110 or a portion of wireless device 110.

Figure 3:
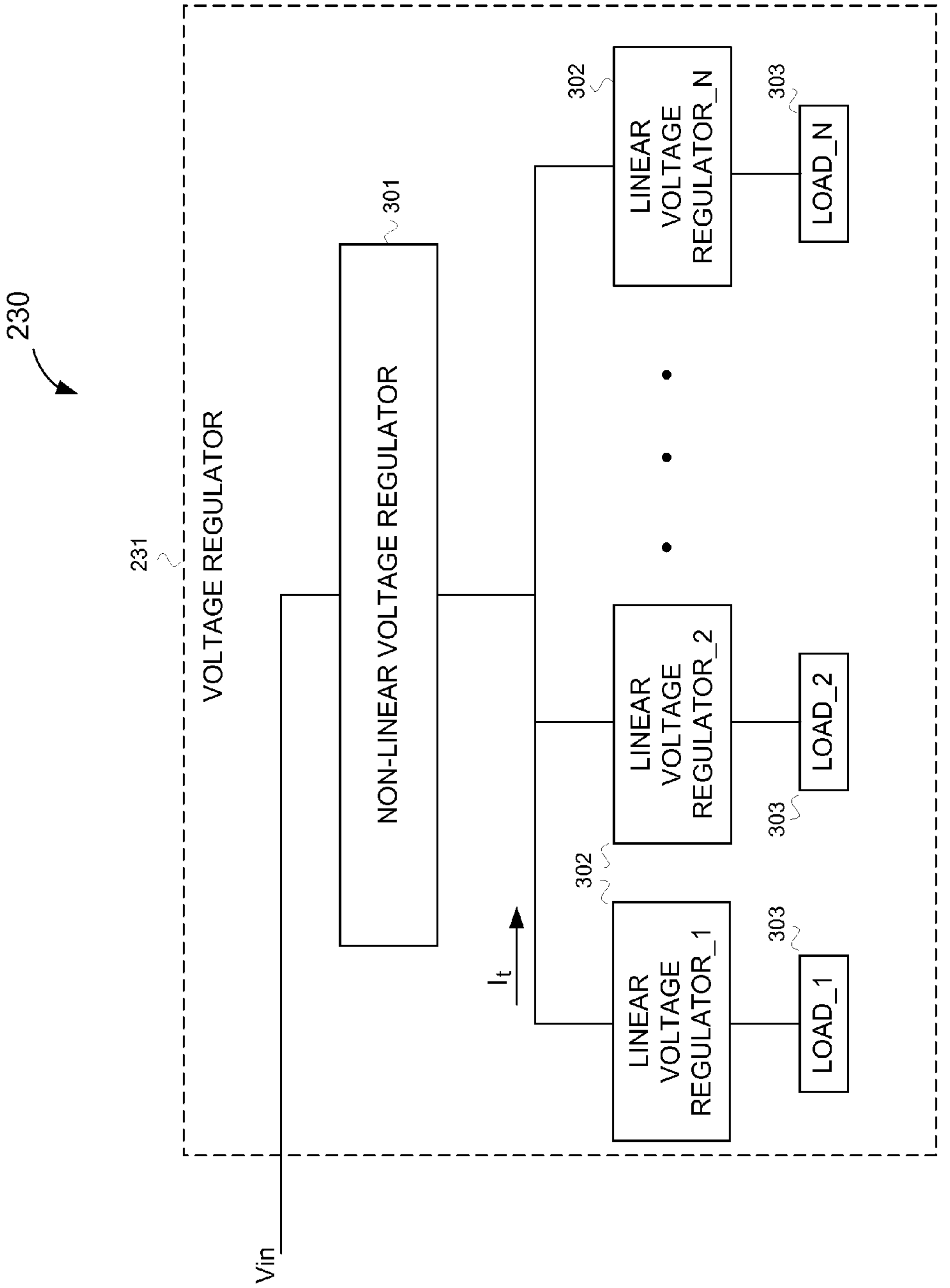
PRIOR ART FIG. 3

FIG. 3 further illustrates the exemplary voltage regulator 231 of FIG. 2. As shown in FIG. 3, the voltage regulators 231 comprises a non-linear voltage regulator 301, connected in series to a set of linear voltage regulators 302, such as linear voltage regulator_1 through linear voltage regulator_N, which are each in turn connected to a load 303, such as to load_1 through load_N, respectively. In this approach, the non-linear voltage regular 301 is used to perform most of the voltage regulation of converting the Vin source voltage to a value very close to the required voltage for a load 303, so to take advantage of the power efficiency of the non-linear voltage regular. The linear voltage regulators 302, which have better noise performance, are then used to perform the final 'fine regulation' of the voltage regulated by the non-linear voltage regular 301.

A shortcoming of the above approach is that when a load change occurs, such as for example in load_1. An example of a load change would be when wireless device 110 comes out of a sleep mode. When the wireless device 110 is in sleep mode, it draws relatively a small amount of current, but when awaked, such as for an incoming call, it draws a larger amount of current. This transition from low current to high current is considered a 'load change event'. In the voltage regulators 231 shown in FIG. 3, a load change results in the generation of an interference current It that propagates upstream from a load-changed linear voltage regulator 302, such as linear voltage regulator_1, and into other linear voltage regulators 302, such as load_2 through load_N, as well as to the non-linear voltage regulator 301. Interference current $I_t$ causes a drop in the voltage supplies to the linear voltage regulators 302, such as to linear voltage regulator_2.

Figure 4A:
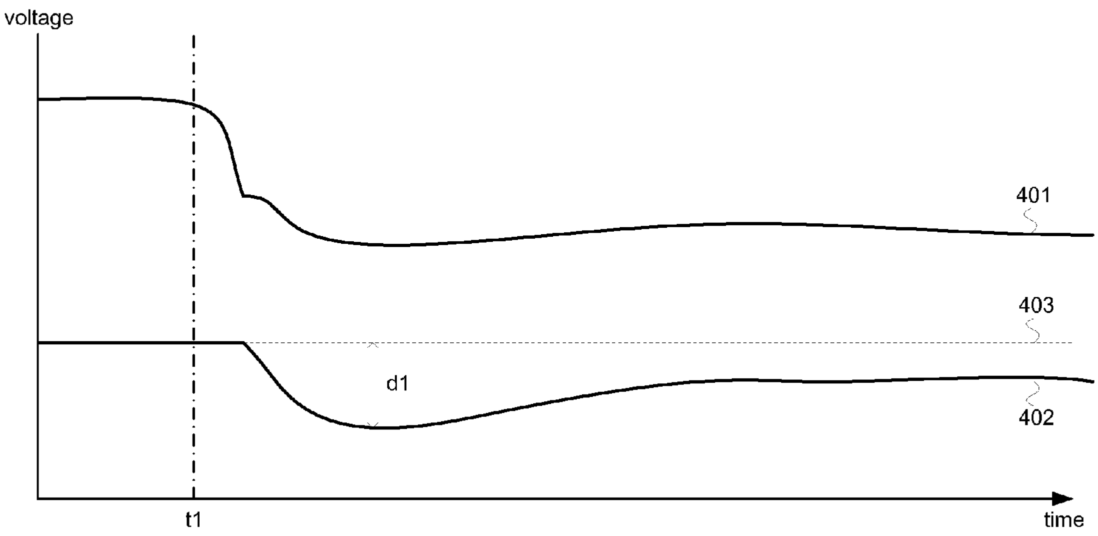
FIG. 4A-B illustrate voltage waveforms corresponding to the operations of exemplary wireless devices.

FIG. 4A illustrates voltage exemplary waveforms 401 and 402 respectively corresponding to the operations of exemplary linear voltage regulator_1 and linear voltage regulator_2 in the voltage regulator 231 shown in FIG. 3. As shown in FIG. 4A, the load_1 corresponding to linear voltage regulator_1 is changed at time $t_1$. The interference current It generated by the load change results in a voltage drop to the input voltage of the linear voltage regulators 302, such as to linear voltage regulator_2. This voltage drop propagates through linear voltage regulator_2 and appears as $d_1$, such as by 0.25 volts, between an affected output voltage 402 and a theoretical unaffected output voltage 403 (represented by dotted line) to the linear voltage regulator_2. This drop in output voltage results in added noise to the load_2 of linear voltage regulator_2.

Figure 5:
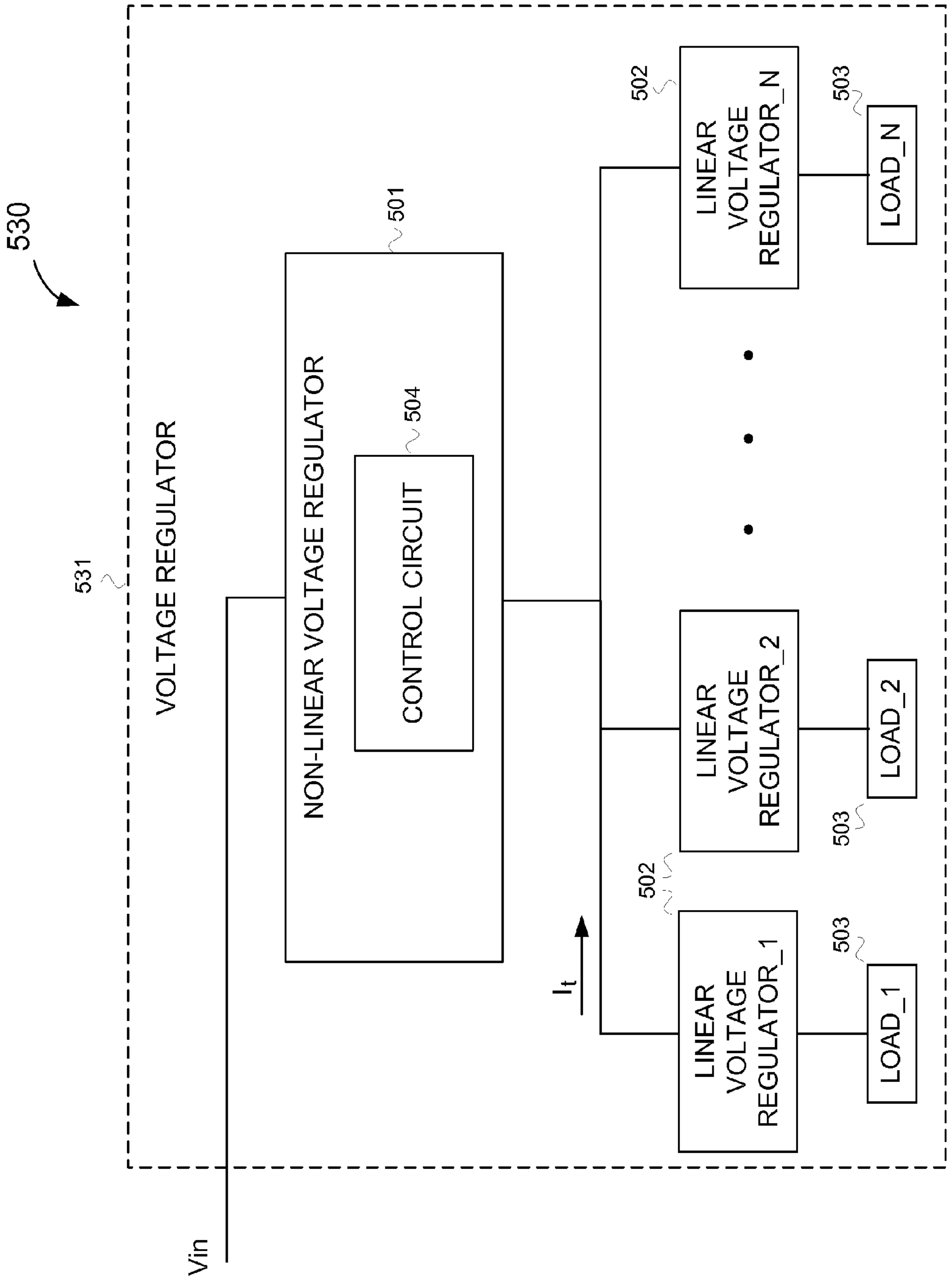
FIG. 5 illustrates an exemplary embodiment of the disclosure.

FIG. 5, in conjunction with FIG. 1, illustrates an exemplary embodiment of a voltage regulator device 531 of the disclosure used in a power management system 530. The voltage regulator device 531 comprises a processor 221 (as shown in FIG. 1) that provides operating instructions and/or data to the voltage regulator device 531. The operating instructions and/or data may be stored in memory 222, which maybe internal or external to the MSM 220.

As also shown in FIG. 5, the voltage regulator device 531 further comprises a voltage regulator 501, such as a non-linear voltage regulator, for example a switching regulator, such as a switched mode power supply (SMPS) regulator, such as a buck voltage regulator. The voltage regulator 501 further comprises a control circuit 504 in communication with the processor 221, such as via a SSBI communication interface, to receive provided instructions from the processor 221. In an exemplary embodiment, the voltage regular 501 comprises registers to store the received operating instructions and/or data. The voltage regular 501 then dynamically modulates an output voltage of the voltage regulator 501 based on the received instructions, as described in greater detail in conjunction with FIGS. 6A-7 below. The voltage regulator device 531 further comprises two or more linear voltage regulators 502, such as linear voltage regulator_1 through linear voltage regulator_N, to receive the output voltage from the non-linear voltage regulator 501. The voltage regulators 502 are connected in parallel with respect to each other and in series with respect to the voltage regulator 501. In an exemplary embodiment, the voltage regulators 502 are low dropout (LDO) voltage regulators. As described in greater detail in conjunction with FIGS. 6A-7, this modulated output voltage received from the voltage regulator 501 reduces a cross-regulation interference between the voltage regulators 502 when a load change occurs in at least one of the voltage regulators 502.

Figure 6A:
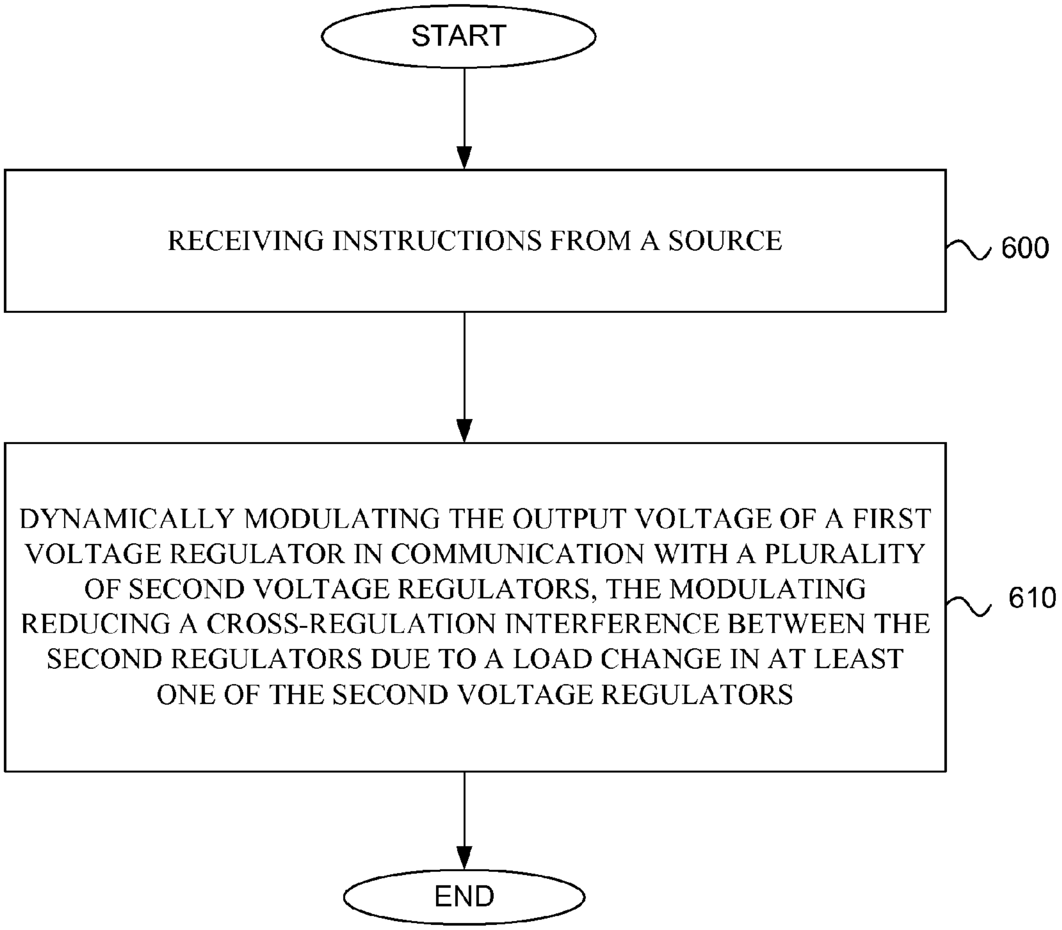
FIGS. 6A-B are flow charts illustrating exemplary methods of the disclosure.
Figure 6B:
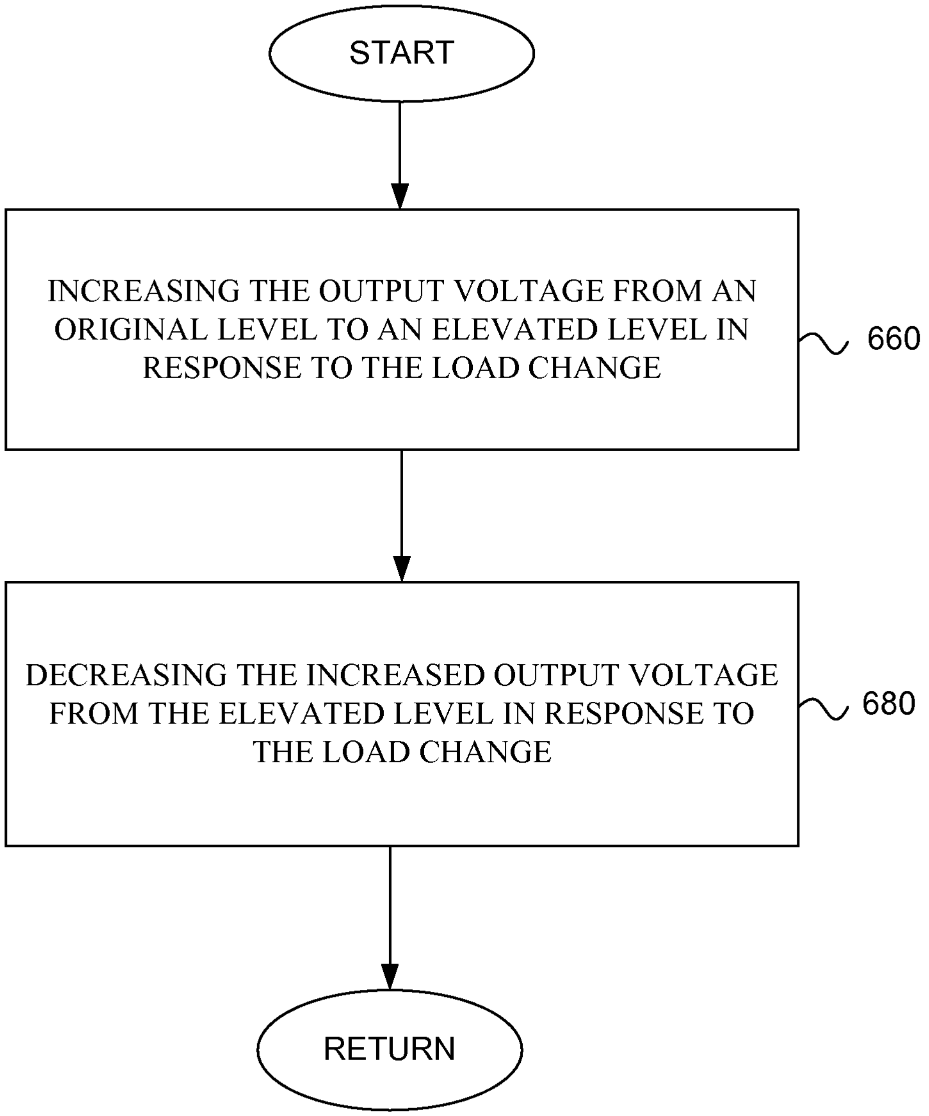

FIGS. 6A-B are flow charts illustrating exemplary methods of the disclosure. As shown in FIG. 6A, the process begins in block 600 in which instructions from a source, such as the processor 221, are received in the non-linear voltage regulator 501, such as in the control circuit 504. In an exemplary embodiment, the non-linear voltage regulator 501 is a buck voltage regulator. Next, in block 610, the output voltage of the non-linear voltage regulator 501 is dynamically modulated to reduce a cross-regulation interference between the linear voltage regulators 502 due to a load change in at least one of the linear voltage regulators 502, such as linear voltage regulator_1, as described in greater detail in conjunction with FIG. 6B. The overall process then ends.

FIG. 6B describes in greater detail the dynamically modulating process of block 610 of FIG. 6A. As shown in FIG. 6B, the process begins in block 660 in which the output voltage of the non-linear voltage regulator 501 is increased from an original level, such as from 2.25 volts, to an elevated level, such as to 2.5 volts, in response to the load change. In an exemplary embodiment, the output voltage is increased from an original level prior to the load change. In an exemplary embodiment in which the linear voltage regulators 502 are low dropout (LDO) linear voltage regulators, the increase in the output voltage of the non-linear voltage regulator 501 effectively results in an increase in the dropout voltage of the linear voltage regulators 502. Next, in block 689, the output voltage of the non-linear voltage regulator 501 is then decreased from the elevated level in response to the load change. In an exemplary embodiment, the output voltage of the non-linear voltage regulator 501 is decreased from the elevated level to the original level in response to the load change. In an exemplary embodiment, the elevated output voltage of the non-linear voltage regulator 501 is decreased, such as from 2.5 volts to 2.25 volts, subsequent to the load change. In an exemplary embodiment, the processor 221 determines the timing of the change in the load 503, such as the timing of when the wireless device 110 goes from a sleep mode to a call mode, of at least one of the linear voltage regulators 502, such as a change in load_1 of linear voltage regulator_1. The processor also determines timing for the dynamic modulation of the output voltage of the non-linear voltage regulator 501 based on the timing of the change in the load 503, such as load_1. The process is then returned to block 610 of FIG. 6A.

Figure 4B:
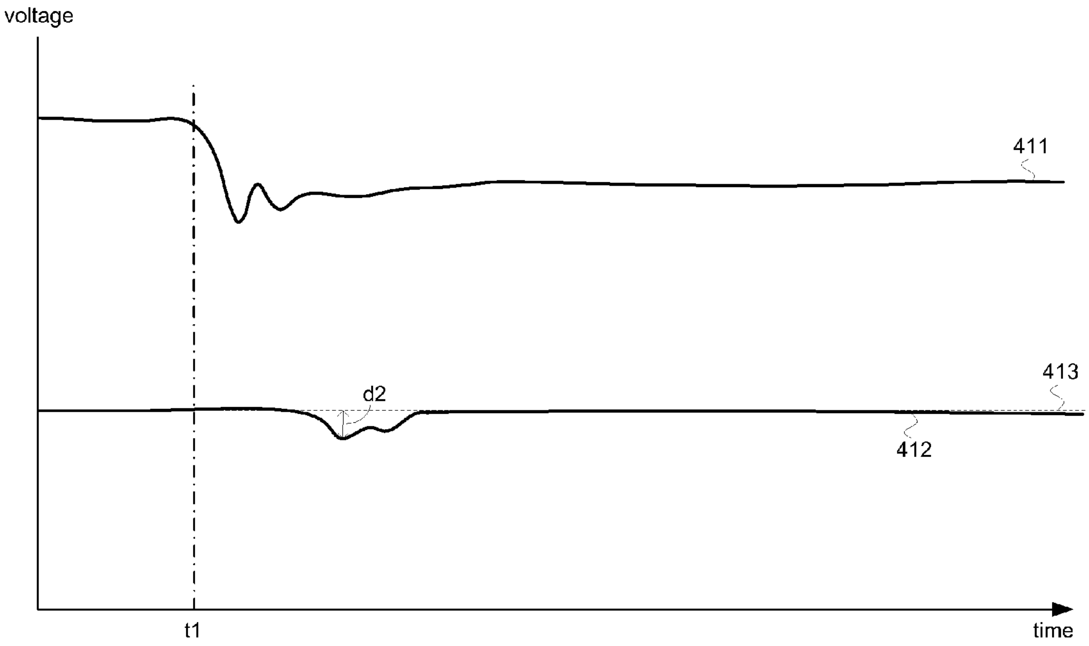

FIG. 4B illustrates exemplary voltage waveforms 411 and 412 respectively corresponding to the operations of linear voltage regulator_1 and linear voltage regulator_2 in the voltage regulator 531 shown in FIG. 5. As shown in FIG. 4B, the load_1 corresponding to linear voltage regulator_1 is changed at time $t_1$. The interference current $I_t$ generated by the load change results in a voltage drop to the input voltage of the linear voltage regulators 502, such as linear voltage regulator_2. This voltage drop propagates through linear voltage regulator 2 and appears as a drop $d_2$, such as by 0.01 volts, between an affected output voltage 412 and a theoretical unaffected output voltage 413 (represented by dotted line) to the linear voltage regulator_2. Due to the increase of the output voltage of the non-linear voltage regulator 501, however, the voltage drop $d_2$ is less than the voltage drop $d_1$ shown in FIG. 4A, and thus results in a correspondingly reduced noise to the load_2 of linear voltage regulator_2.

Figure 7:
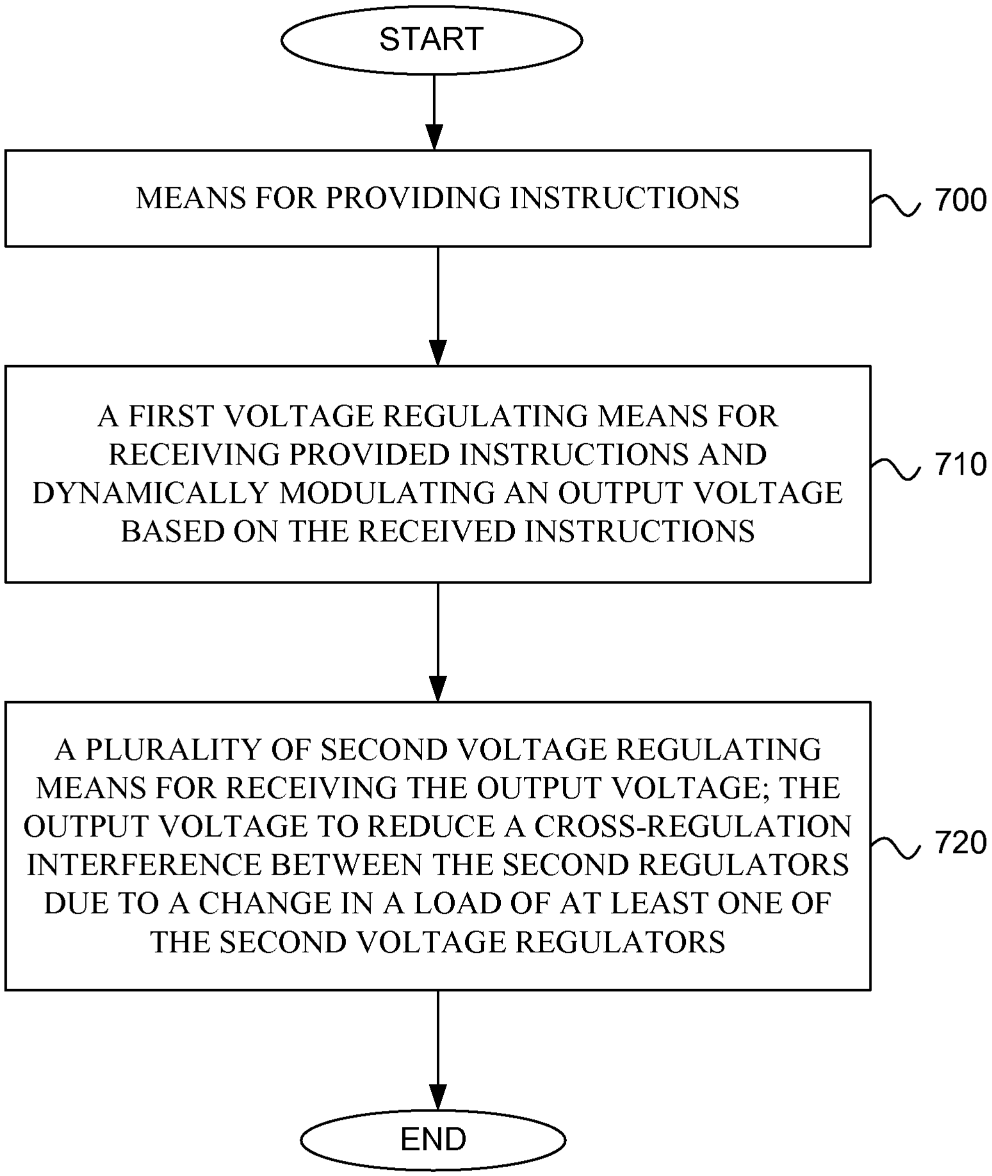
FIG. 7 is a functional block diagram illustrating the flow of operations executed by exemplary embodiments of the disclosure.

FIG. 7 is a functional block diagram illustrating the flow of operations executed by exemplary embodiments of the disclosure, as described above in conjunction with FIG. 4B through FIG. 6B. Starting with block 700 of FIG. 7, exemplary means for providing instructions may include processor 221 providing information to the power management system 530 to the voltage regulator device 531. Next, in block 710, exemplary voltage regulating means for receiving provided instructions and dynamically modulating an output voltage based on the received instructions may include the non-linear voltage regulator 501. Next, in block 720, exemplary plurality of voltage regulating means for receiving the output voltage may include linear voltage regulator 502. The output voltage reduces a cross-regulation interference between the linear voltage regulator 502 due to a change in a load of at least one of the linear voltage regulator 502.

It should be noted that the various exemplary embodiments were discussed separately for purposes of illustrations, but that they maybe combined in one embodiment having some or all of the features of the separately illustrated embodiments.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It should be noted that the methods described above can be implemented in computer program product having a computer-readable medium with code for causing a computer to perform the above described processes. In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but are to be accorded the widest scope consistent with the principles and novel features disclosed herein.

What is claimed is:

1. A method comprising:

supplying an output voltage from a first voltage regulator to a plurality of second voltage regulators connected to one or more loads of a plurality of loads;

dynamically modulating at the first voltage regulator the output voltage of the first voltage regulator by varying the output voltage in response to an anticipated load change known at the first voltage regulator but occurring to at least one of the plurality of second voltage regulators, the modulating in the first voltage regulator performed based on and prior to the load change; and adjusting an amount of dropout voltage of one or more of the plurality of second voltage regulators by adjusting the output voltage of the first voltage regulator due to the anticipated load change occurring to the at least one of the plurality of second voltage regulators, the amount adjusted based on the varied output voltage supplied to the plurality of second voltage regulators.

2. The method of claim 1, the dynamically modulating the output voltage further comprising:

increasing the output voltage from an original level to an elevated level in response to the load change during at least one time period; and decreasing the increased output voltage from the elevated level in response to the load change during at least one other time period.

3. The method of claim 2, the increasing the output voltage further comprising increasing the output voltage from an original level prior to the load change.

4. The method of claim 2, the decreasing the increased output voltage further comprising: decreasing the increased output voltage subsequent to the load change.

5. The method of claim 4, the decreasing the increased output voltage further comprising:

decreasing the increased output voltage to the original voltage level.

6. The method of claim 1, the dynamically modulating the output voltage further comprising:

receiving instructions from a source wherein the output voltage is dynamically modulated based on the received instructions.

7. A device comprising:

a first voltage regulator means for supplying an output voltage to a plurality of second voltage regulator means respectively connected to one or more loads of a plurality of loads;

means for dynamically modulating the output voltage of the first voltage regulating means by varying the output voltage to adjust an amount of dropout voltage of one or more of the plurality of second voltage regulator means by adjusting the output voltage of the first voltage regulator means in response to an anticipated load change known at the first voltage regulator means but occurring to at least one of the plurality of second voltage regulator means;

wherein the modulation of the output voltage by the first voltage regulator means is performed based on and prior to the load change.

8. A computer-readable storage media storing instructions that when executed by a processor cause the processor to perform instructions, the instructions causing a computer to dynamically modulate, at a first voltage regulator configured to supply an output voltage to a plurality of second voltage regulators, the output voltage of the first voltage regulator by varying the output voltage to adjust an amount of dropout voltage at one or more of the plurality of second voltage regulators by adjusting the output voltage of the first voltage regulator in response to an anticipated load change known at the first voltage regulator but occurring to at least one of the plurality of second voltage regulators;

wherein the modulating in the first voltage regulator is performed based on and prior to the load change occurring to the at least one of the plurality of second voltage regulators.

9. The computer-readable storage media of claim 8, wherein causing a computer to dynamically modulate the output voltage further comprises:

increasing the output voltage from an original level to an elevated level in response to the load change during at least one time period; and decreasing the increased output voltage from the elevated level in response to the load change during at least one other time period.

10. The computer-readable storage media of claim 9, wherein increasing the output voltage further comprises increasing the output voltage from an original level prior to the load change.

11. The computer-readable storage media of claim 9, wherein decreasing the increased output voltage further comprises decreasing the increased output voltage subsequent to the load change.

12. A device comprising:

a first voltage regulator configured to supply an output voltage to a the plurality of second voltage regulators respectively connected to the plurality of loads, the first voltage regulator further configured to dynamically modulate the output voltage of the first voltage regulator by varying the output voltage, in response to an anticipated load change known at the first voltage regulator but occurring to at least one of the plurality of second voltage regulators, to adjust an amount of dropout voltage of one or more of the plurality of second voltage regulators by adjusting the output voltage of the first voltage regulator due to the anticipated load change occurring to the at least one of the plurality of second voltage regulators;

wherein the modulating in the first voltage regulator is performed prior to the load change occurring to at least one of the plurality of second voltage regulators.

13. The device of claim 12, wherein the first voltage regulator comprises a non-linear voltage regulator and wherein each of the plurality of second voltage regulators comprises a linear voltage regulator.

14. The device of claim 12, wherein the first voltage regulator comprises a control circuit to receive instructions and to dynamically modulate an output voltage of the first voltage regulator based on the received instructions.

15. The device of claim 13, wherein at least one of the linear voltage regulators comprises a low dropout (LDO) linear regulator.

16. The device of claim 13, wherein the first voltage regulator comprises a buck voltage regulator.

17. The device of claim 12, wherein each of the plurality of second voltage regulators are connected in parallel with respect to the other second voltage regulators and in series in respect to the first voltage regulator.

18. The device of claim 12, wherein the first voltage regulator increases the output voltage from an original level in response to the load change and decreases the increased output voltage in response to the load change.

19. The device of claim 12, further comprising a processor configured to determine a timing of the load change of at least one of the plurality of second voltage regulators and the dynamic modulation of the output voltage based on the timing of the load change.

20. The device of claim 14, further comprising:

a memory in communication with the processor to store at least one of instructions and data, wherein the received instructions comprises the at least one of the stored instructions and data.

* * * * *